US 7,952,227 B2

United States Patent
Mitsuoka et al.

(10) Patent No.: US 7,952,227 B2
(45) Date of Patent: May 31, 2011

(54) FEED INTERMEDIATE APPARATUS, FEEDING SYSTEM, AND FEED INTERMEDIATE METHOD

(75) Inventors: Madoka Mitsuoka, Kawasaki (JP); Shigeki Fukuta, Kawasaki (JP); Shunsuke Yamaguchi, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 12/356,896

(22) Filed: Jan. 21, 2009

(65) Prior Publication Data

US 2009/0284071 A1 Nov. 19, 2009

(30) Foreign Application Priority Data

May 14, 2008 (JP) ................................ 2008-127722

(51) Int. Cl.
*H02J 1/10* (2006.01)
(52) U.S. Cl. ...................................... 307/29; 455/127.1
(58) Field of Classification Search .............. 307/29–31; 455/571–574, 127.1, 127.5, 270, 343.1–343.6
See application file for complete search history.

(56) References Cited

U.S. PATENT DOCUMENTS

| 6,785,564 | B1 * | 8/2004 | Quigley et al. ............... 455/574 |
| 7,289,468 | B2 * | 10/2007 | Yang et al. .................... 370/329 |
| 7,403,791 | B2 * | 7/2008 | Oki et al. ...................... 455/522 |
| 7,609,171 | B2 * | 10/2009 | Haapoja et al. .......... 340/870.39 |
| 2004/0263122 | A1 | 12/2004 | Morisawa |

FOREIGN PATENT DOCUMENTS

| JP | A 2000-29576 | 1/2000 |
| JP | A 2005-25382 | 1/2005 |
| JP | A 2007-288401 | 11/2007 |

* cited by examiner

*Primary Examiner* — Albert W Paladini
(74) *Attorney, Agent, or Firm* — Fujitsu Patent Center

(57) ABSTRACT

A feed hub includes a priority receiving unit that acquires priority indicating degree of need of electricity feed, for each of plural terminals, a feed relation determining unit that selects two communication devices having different priorities acquired by the priority receiving unit, determines the communication device having lower priority as a feed source and the communication device having higher priority as a feed destination from the selected communication devices, an electricity switching unit that connects the feed source and the feed destination determined by the feed relation determining unit, and a feed requesting unit that requests the feed source determined by the feed relation determining unit to feed electricity.

14 Claims, 12 Drawing Sheets

| PORT | MAC ADDRESS | FEED ELECTRICITY [W] | PRIORITY OF FEED NEED | REQUIRED ELECTRICITY [W] |
|---|---|---|---|---|
| 1 | 00-14-85-FO-22-72 | 25 | 1 | 25 |
| 2 | 00-14-85-FO-22-77 | 25 | 3 | 25 |
| 3 | 00-14-85-OA-DE-11 | 25 | 6 | 25 |
| 4 | 00-14-9A-FO-67-A2 | 0 | 10 | 25 |

| FEED SOURCE PORT | FEED DESTINATION PORT |
|---|---|
| 1 | 4 |
| 2 | 3 |
| 3 | - |
| 4 | - |

FEED INTERMEDIATE APPARATUS, FEEDING SYSTEM, AND FEED INTERMEDIATE METHOD

CROSS-REFERENCE TO RELATED APPLICATION(S)

This application is based upon and claims the benefit of priority of the prior Japanese Patent Application No. 2008-127722, filed on May 14, 2008, the entire contents of which are incorporated herein by reference.

FIELD

The embodiment(s) discussed herein is (are) directed to a feed intermediate apparatus, a feeding system, and a feed intermediate method that intermediate electricity feeding to a communication device.

BACKGROUND

Conventionally, there is known an art of using "peak shift" that effectively utilizes electricity of nighttime during which electricity use is generally small and electricity rate is low, in order to realize reduction in electricity rate and equalization of load of electricity demand.

For example, as for an electronic device drivable by a battery, there is known a technique that the battery is charged by automatically feeding electricity to the battery from an AC (alternating current) power source in a predetermined night-time, and the battery and the AC power source are automatically switched over to function as a driving power source of the electronic device according to predetermined times during which the AC power source and the battery are respectively usable (e.g., see Japanese Patent Application Laid-open No. 2000-29576).

Also known is a technique that such an electronic device is scheduled to be used under driving by a battery is determined, and when the electronic device is scheduled to be used under battery driving, the battery is charged by feeding electricity to the battery by using the AC power source even if the present time falls within the time during which use of AC power source is prohibited (e.g., see Japanese Patent Application Laid-open No. 2005-25382).

In the network system in which such an electronic device is connected with a feeding hub by using a network cable, also known is a technique that each electronic device instructs priority of feed need to the feeding hub, and the electricity feeding is conducted for each electronic device according to the instructed priority (e.g., see Japanese Patent Application Laid-open No. 2007-288401).

However, in a conventional feeding technique for an electronic device which is drivable by a battery, when an amount of charge of the battery of the electronic device runs short in daytime, the electronic device is charged from an AC power source, however, since the electricity rate of AC power source in daytime is high, the electricity rate will not be reduced, and the load of electricity demand is not equalized.

Furthermore, even when a setting is made to use a battery and not to use AC power source in daytime during which a predetermined battery is usable, the electronic device has to use AC power source of high electricity rate when the battery runs short in daytime during which electricity rate of AC power source is high, so that the electricity rate is not reduced, and load of electricity demand is not equalized.

When there is a schedule that the electronic device is used by battery driving, it is necessary to use AC power source of high electricity rate even when the current time is a daytime during which use of AC power source is prohibited, so that the electricity rate is not reduced, and load of electricity demand is not equalized.

SUMMARY

According to an aspect of an embodiment, a feed intermediate apparatus includes an acquiring unit that acquires priority indicating degree of need of electricity feeding, for each of a plurality of communication devices; a selecting unit that selects two communication devices having different priorities acquired by the acquiring unit; a determining unit that determines a communication device having lower priority as a feed source, while determining a communication device having higher priority as a feed destination; a connecting unit that connects the feed source and the feed destination determined by the determining unit; and a requesting unit that request the feed source determined by the determining unit to supply electricity.

According to another aspect of an embodiment, a feeding system includes a feed intermediate apparatus and a plurality of chargeable communication devices. The feed intermediate apparatus includes an acquiring unit that acquires priority indicating degree of need of electricity feeding, for each of the plurality of chargeable communication devices; a selecting unit that selects two communication devices having different priorities acquired by the acquiring unit; a determining unit that determines a communication device having lower priority as a first communication device, while determining a communication device having higher priority as a second communication device; a connecting unit that connects the first communication device and the second communication device determined by the determining unit; and a requesting unit that request the first communication device determined by the determining unit to supply electricity. The first communication device includes a request receiving unit that receives a feed request requested by the requesting unit, and a feeding unit that feeds electricity to the second communication device upon reception of the feed request by the feed request receiving unit.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWING(S)

DETAILED DESCRIPTION OF THE PREFERRED EMBODIMENT(S)

In the following, embodiments of a feed intermediate apparatus, a feeding system, a feed intermediate method and a feeding method according to the present invention will be explained in detail by referring to accompanying drawings. The present invention will not be limited to these embodiments.

Figure 1:
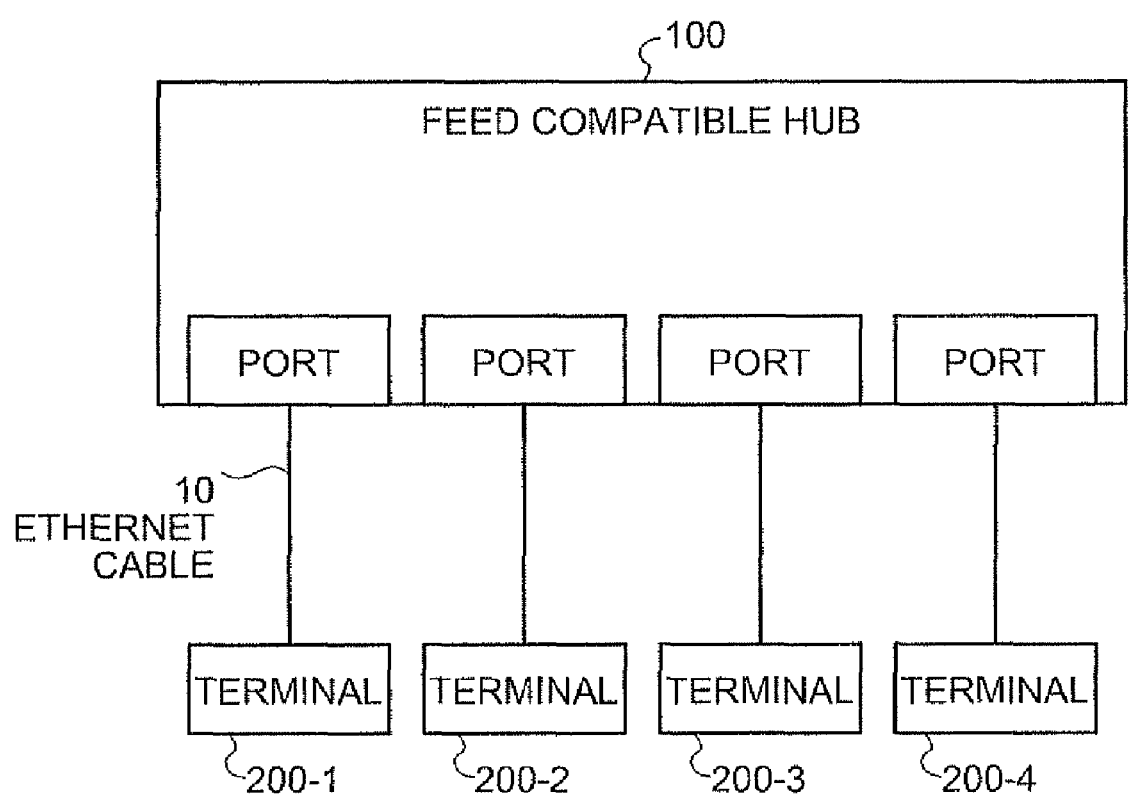
FIG. 1 is a view depicting one example of an overall configuration of a feeding system according to a first embodiment.

FIG. 1 is a view depicting one example of an overall configuration of a feeding system according to a first embodiment. As depicted in FIG. 1, the feeding system includes a feed compatible hub (or feeding hub) 100 and terminals 200-1 to 200-4, and the feed compatible hub 100 and the terminals 200-1 to 200-4 are connected by an Ethernet (trademark) cable 10. The feed compatible hub 100 connects with terminals of the number of the provided ports.

The feed compatible hub 100 is a hub utilizing the PoE (power over Ethernet (trademark)) technique for conducting feeding and communication with the connected plural terminals 200-1 to 200-4, and intermediates feeding between the connected terminals 200-1 to 200-4. That is, the feed compatible hub 100 acquires priority indicating the degree of need of feeding for each of the connected terminals 200-1 to 200-4, and intermediates feeding from a terminal of lower priority to a terminal of higher priority between terminals having different priorities. Here, priority indicating the degree of need of feeding of terminal means priority indicating the degree of need of charging of battery incorporated in the terminal, for example, priority numerically indicating expectation of use of electricity, and is referred to as "priority of feed need" herein after. In the present embodiment, the feed compatible hub 100 feeds terminals 200-1 to 200-4 from AC power source in predetermined nighttime during which the electricity rate is low, and essentially does not feed from AC power source in daytime during which the electricity rate is high.

The Ethernet cable 10 is a cable for conducting communication, and is a cable for feeding electricity between the feed compatible hub 100 and the terminals 200-1 to 200-4.

The terminals 200-1 to 200-4 are communication devices capable of being driven by battery. The terminals 200-1 to 200-4 are communication devices adapted to the PoE technique in order to exchange electricity with the feed compatible hub 100. The terminals 200-1 to 200-4 are for example, but are not limited to, notebook personal computers.

Figure 2:
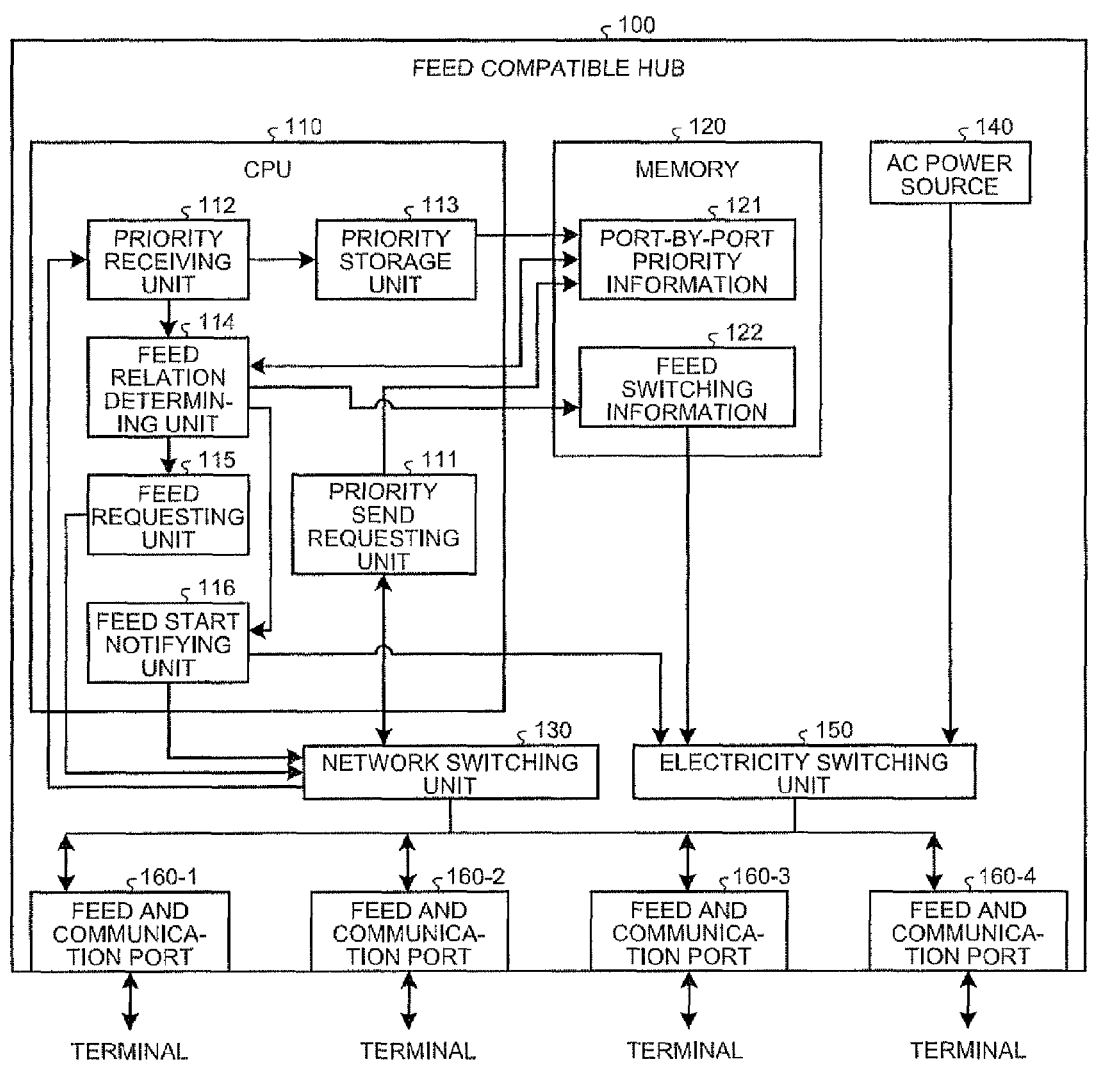
FIG. 2 is a functional block diagram of a configuration of a feed compatible hub according to the first embodiment.

Next, FIG. 2 is a functional block diagram of a configuration of a feed compatible hub according to the first embodiment. As depicted in FIG. 2, the feed compatible hub 100 includes a CPU (central processing unit) 110, a memory 120, a network switching unit 130, an AC power source 140, an electricity switching unit 150, and feed and communication ports 160-1 to 160-4.

The CPU 110 is a central processing unit that executes processes of processors, and as such processors, a priority send requesting unit 111, a priority receiving unit 112, a priority storage unit 113, a feed relation determining unit 114, a feed requesting unit 115 and a feed start notifying unit 116 are provided.

When connection of a terminal to the feed and communication ports 160-1 to 160-4 is notified by the network switching unit 130, the priority send requesting unit 111 stores terminal information of the connected terminal contained in the notification, as port-by-port priority information 121 in the memory 120. The priority send requesting unit 111 outputs a send request to the network switching unit 130 for requesting terminals connected to the feed and communication ports 160-1 to 160-4 to send priority of feed need.

The priority receiving unit 112 acquires priority of feed need of terminal connected for each of the feed and communication ports 160-1 to 160-4 from the network switching unit 130. At this time, the priority receiving unit 112 also acquires feed electric energy feedable by the terminal to other terminal, and required electric energy least required for the terminal to be charged. Then the priority receiving unit 112 outputs priority of feed need, feed electric energy and required electric energy of each terminal to the priority storage unit 113.

The priority storage unit 113 acquires priority of feed need, feed electric energy and required electric energy of connected terminal for each of the feed and communication ports 160-1 to 160-4 from the priority receiving unit 112, and stores them as port-by-port priority information 121 in the memory 120.

The feed relation determining unit 114 determines relation between a feed source of electricity and a feed destination of electricity, based on priority of feed need of connected terminal for each of the feed and communication ports 160-1 to 160-4 held in the port-by-port priority information 121. For example, the feed relation determining unit 114 selects a terminal having the highest priority of feed need and a terminal having the lowest priority of feed need, from priority of feed need for each terminal. The feed relation determining unit 114 may select terminals having the same order of priority of feed need from top and bottom (for example, the one having the highest priority of feed need and the one having the lowest priority of fed need, or the one having the second highest priority of feed need and the one having the second lowest priority of feed need) from priority of feed need of each terminal. Then the feed relation determining unit 114 determines the terminal of lower priority of feed need as a candidate feed source of electricity and the terminal of higher priority of feed need as a candidate feed destination of electricity, of the selected terminals. In order to examine whether the candidate feed source has electric energy that can be used besides using for charging, the feed relation determining unit 114 determines whether feed electric energy of the terminal of candidate feed source exceeds required electric energy for feeding to the terminal of candidate feed destination. Then the feed relation determining unit 114 determines the terminal of candidate feed source as a feed source, and the terminal of candidate feed destination as a feed destination when feed electric energy of the terminal of candidate feed source exceeds required electric energy of the terminal of candidate feed destination. The feed relation determining unit 114 outputs the determined feed source to the feed requesting unit 115 and outputs the determined feed destination to the feed start notifying unit 116. Furthermore, the feed relation determining unit 114 makes the memory 120 store the determined feed source and feed destination as feed switching information 122. The feed relation determining unit 114 will be explained later in detail.

The feed requesting unit 115 outputs a feed request to the network switching unit 130 for requesting the terminal of feed source determined by the feed relation determining unit 114 to conduct electricity feeding.

After the feed requesting unit 114 outputs a feed request, the feed start notifying unit 116 instructs the electricity switching unit 150 to start feeding. At this time, the feed start notifying unit 116 outputs a feed start notification to the network switching unit 130 so as to notify the terminal of feed destination determined by the feed relation determining unit 114 of start of feeding.

The memory 120 stores an execution result or the like including execution midcourse result of process executed by the CPU 110, for example, stores the port-by-port priority information 121 and the feed switching information 122.

Figures 3, 4, 5:
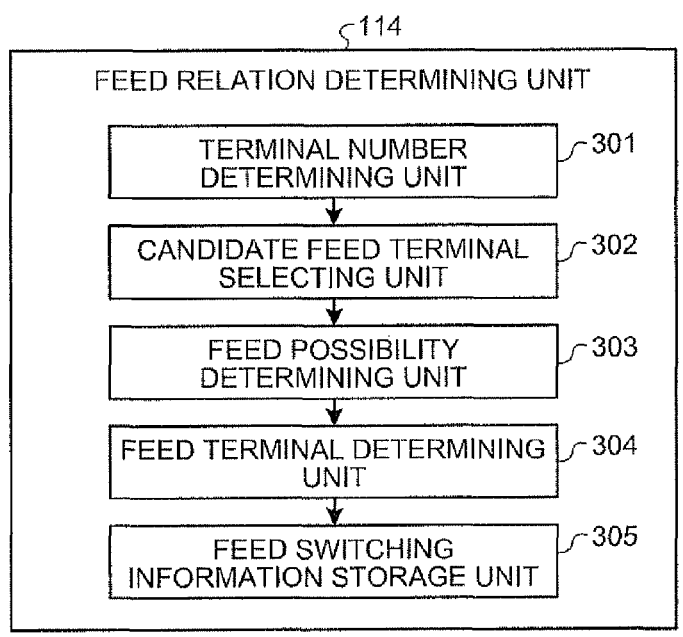
FIG. 3 is a view depicting one example of data structure of port-by-port priority information.
FIG. 4 is a view depicting one example of data structure of feed switching information.
FIG. 5 is a functional block diagram of a configuration of a feed relation determining unit.

The port-by-port priority information 121 is information indicating need of feeding for each of the terminals 200-1 to 200-4 connected to the feed and communication ports 160-1 to 160-4. Here, data structure of the port-by-port priority information 121 will be explained with reference to FIG. 3. As depicted in FIG. 3, the port-by-port priority information 121 holds port, MAC (media access control) address, feed electricity, priority of feed need and required electricity. Port represents the number of feed and communication ports 160-1 to 160-4 to which terminals are connected. MAC address represents MAC address of terminals connected to feed and communication ports 160-1 to 160-4. Feed electricity represents electric energy feedable by terminals connected to feed and communication ports 160-1 to 160-4. Priority of feed need represents priority of terminals connected to feed and communication ports 160-1 to 160-4. Required electricity represents least required electric energy in conducting charging defined by terminal specification of terminals connected to feed and communication ports 160-1 to 160-4.

The feed switching information 122 is information including feed source and feed destination pairwise so as to intermediate electricity feeding to the terminals 200-1 to 200-4 connected with the feed and communication ports 160-1 to 160-4. Here, data structure of the feed switching information 122 will be explained with reference to FIG. 4. As depicted in FIG. 4, the feed switching information 122 holds feed source port and feed destination port. Feed source port represents the number of feed and communication ports 160-1 to 160-4 to which terminal of feed source is connected, feed destination port represents the number of feed and communication ports 160-1 to 160-4 to which terminal of feed destination is connected.

The network switching unit 130 intermediates communication between the terminals 200-1 to 200-4 connected to the feed and communication ports 160-1 to 160-4. The network switching unit 130 also acquires information sent from the terminals 200-1 to 200-4 connected with the feed and communication ports 160-1 to 160-4 from the feed and communication ports 160-1 to 160-4, and outputs them to the priority receiving unit 112. Further, the network switching unit 130 sends information respectively output from the priority send requesting unit 111, the feed requesting unit 115 and the feed start notifying unit 116 to the terminals 200-1 to 200-4 connected with the feed and communication ports 160-1 to 160-4. Further, when a terminal is connected with the feed and communication ports 160-1 to 160-4, the network switching unit 130 detects the connection, and notifies the priority send requesting unit 111 of terminal information of the connected terminal.

The AC power source 140 converts the alternate current acquired from an electric outlet to the direct current. The AC power source 140 feeds the terminals 200-1 to 200-4, for example in a predetermined nighttime during which the electricity rate is low.

The electricity switching unit 150 intermediates feeding between the terminals 200-1 to 200-4 connected to the feed and communication ports 160-1 to 160-4. More specifically, upon acquisition of a feed start command from the feed start notifying unit 116, the electricity switching unit 150 establishes connection so that electricity is supplied from the feed source to the feed destination, by referring to the feed and communication port to which the feed source is connected, and the feed and communication port to which the feed destination is connected from the feed switching information 122.

The feed and communication ports 160-1 to 160-4 are ports through which the feed compatible hub 100 is able to conduct feeding and communication.

Next, a function of determining terminal relation between feed source of electricity and feed destination of electricity by the feed relation determining unit 114 of the feed compatible hub according to the first embodiment will be explained with reference to FIG. 5. FIG. 5 is a functional block diagram of a configuration of the feed relation determining unit 114. As depicted in FIG. 5, the feed relation determining unit 114 includes a terminal number determining unit 301, a candidate feed terminal selecting unit 302, a feed possibility determining unit 303, a feed terminal determining unit 304 and a feed switching information storage unit 305.

The terminal number determining unit 301 determines whether two or more terminals are connected to the feed and communication ports 160-1 to 160-4 in order to determine terminals of feed source and feed destination. More specifically, the terminal number determining unit 301 determines whether the number of referred ports is two or more by referring to the number of ports held by the port-by-port priority information 121.

When it is determined by the terminal number determining unit 301 that the number of ports is two or more, the candidate feed terminal selecting unit 302 selects the highest and the lowest priorities from the priorities held in the port-by-port priority information 121, and selects the terminal having the lowest priority as a candidate feed source, and the terminal having the highest priority as a candidate feed destination. The candidate feed terminal selecting unit 302 selects a candidate feed source and a candidate feed destination by selecting the highest priority and the lowest priority from the priorities excluding those of the terminals determined as the feed source and the feed destination after the terminals of the feed source and the feed destination are determined.

The feed possibility determining unit 303 determines whether the candidate feed source determined by the candidate feed terminal selecting unit 302 is able to feed electricity. More specifically, the feed possibility determining unit 303 determines whether electric energy of the terminal of the candidate feed source is equal to or more than required electric energy of the terminal of the candidate feed destination, by referring to the feed electric energy of the terminal of the candidate feed source and the required electric energy of the terminal of the candidate feed destination from the port-by-port priority information 121. When feed electric energy of the terminal of the candidate feed source is equal to or more than required electric energy of the terminal of the candidate feed destination, the feed possibility determining unit 303 outputs numbers of feed and communication ports 160-1 to 160-4 to which the terminals of the candidate feed source and the candidate feed destination are connected, to the feed terminal determining unit 304.

The feed terminal determining unit 304 determines the terminal of the candidate feed source connected to the numbers of the feed and communication ports 160-1 to 160-4 output by the feed possibility determining unit 303 as a feed source terminal, and the terminal of the candidate feed destination connected to the number of the feed and communication ports 160-1 to 160-4 as a feed destination terminal.

The feed switching information storage unit 305 stores numbers of the feed and communication ports 160-1 to 160-4 connected to the feed source terminal and the feed destination terminal determined by the feed terminal determining unit 304 in the feed switching information 122.

Figure 6:
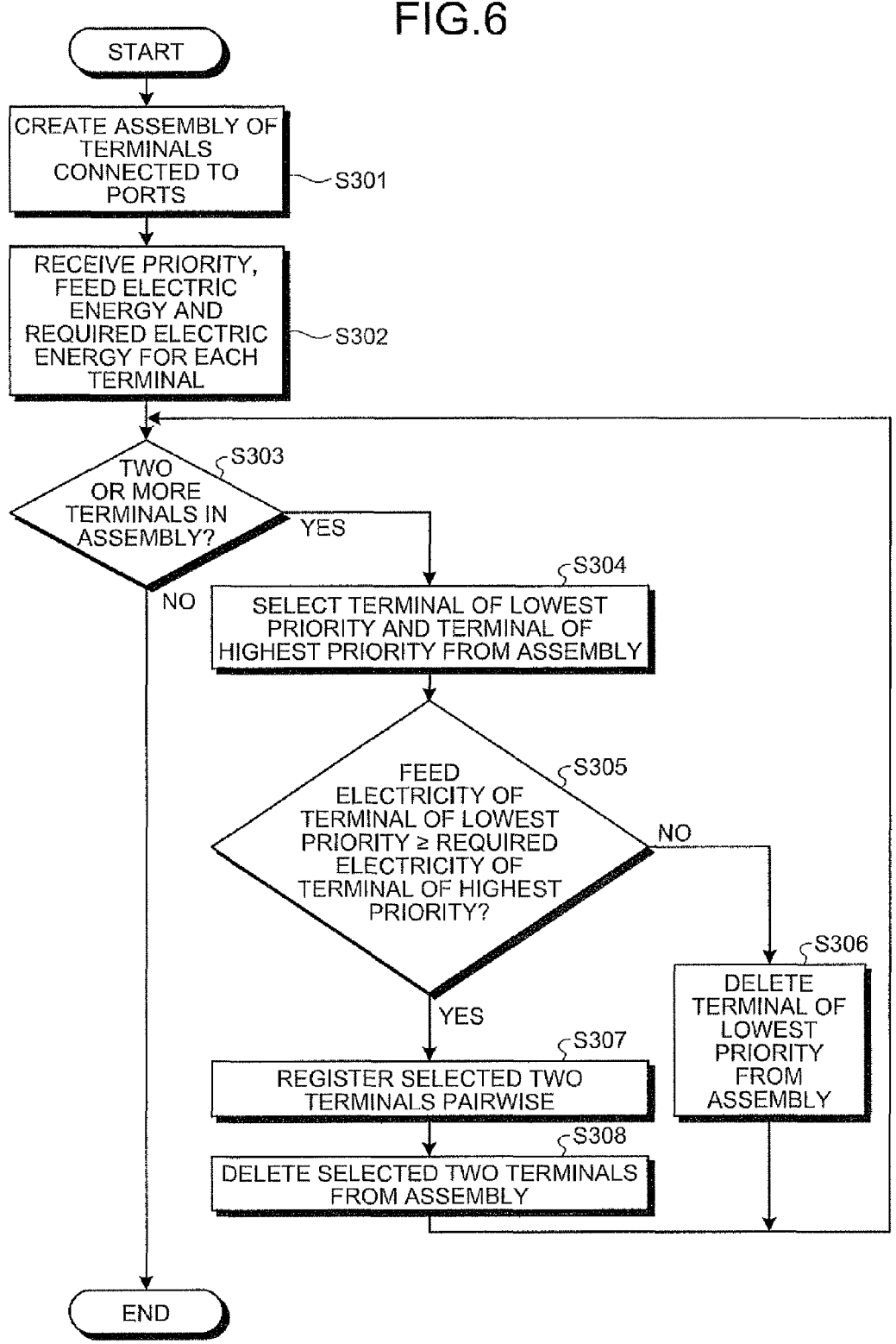
FIG. 6 is a flowchart of an outline of process of determining feed relation.

Next, an outline of a process of determining feed relation of the feed compatible hub according to the first embodiment will be explained with reference to FIG. 6. FIG. 6 is a flowchart of an outline of a process of determining feed relation.

First, the network switching unit 130 detects that a terminal is connected to the feed and communication ports 160-1 to 160-4, and notifies the priority send requesting unit 111 of a port number of detected ports, and a MAC address of the terminal connected with the port.

Then the priority send requesting unit 111 creates an assembly of connected terminals from the port number of the notified port and MAC address (S301). To be more specific, the priority send requesting unit 111 holds the port number and the MAC address of the terminal connected to the port, as the port-by-port priority information 121 in the memory 120. The priority send requesting unit 111 requests the notified port to send priority of feed need.

Thereafter, the priority receiving unit 112 receives priority of feed need, feed electric energy and required electric energy for each port (S302). At this time, the priority receiving unit 112 holds the priority of feed need, feed electric energy and required electric energy sent from the terminal connected to the port, in the port-by-port priority information 121 via the priority storage unit 113.

Then, the terminal number determining unit 301 determines whether the number of ports to which a terminal is connected is two or more by referring to the port-by-port priority information 121 (S303).

When it is determined that the number of ports is less than two (No at S303), the terminal number determining unit 301 is unable to determine a feed source terminal and a feed destination terminal, and hence the process of determining feed relation ends.

On the other hand, when the terminal number determining unit 301 determines that the number of ports is two or more (Yes at S303), the candidate feed terminal selecting unit 302 selects a port having the lowest priority of feed need and a port having the highest priority of feed need by referring to the port-by-port priority information 121 (S304). That is, the terminal connected to the port having the lowest priority of feed need is a candidate feed source, and the terminal connected to the port having the highest priority of feed need is a candidate feed destination.

When the port having the lowest priority of feed need and the port having the highest priority of feed need are selected by the candidate feed terminal selecting unit 302, the feed possibility determining unit 303 determines whether feed electricity corresponding to the port having the lowest priority of feed need is equal to or more than required electricity corresponding to the port having the highest priority of feed need by referring to the port-by-port priority information 121 (S305).

When it is determined that feed electricity corresponding to the port having the lowest priority of feed need is equal to or more than required electricity corresponding to the port having the highest priority of feed need by the feed possibility determining unit 303 (Yes at S305), the feed terminal determining unit 304 determines the port having the lowest priority of feed need as a feed source port, and the port having the highest priority of feed need as a feed destination port, and the feed switching information storage unit 305 registers the feed source port and the feed destination port pairwise in the feed switching information 122 (S307). At this time, the terminal connected to the feed source port is a feed source terminal, and the terminal connected to the feed destination port is a feed destination terminal.

When registration to the feed switching information storage unit 305 is made by the feed switching information storage unit 305, the feed switching information storage unit 305 deletes priority information for the feed source port and the feed destination port from the port-by-port priority information 121 (S308). Then a process of determining feed relation is continued until the number of ports held by the port-by-port priority information 121 is less than two as determined by the terminal number determining unit 301.

On the other hand, when it is determined by the feed possibility determining unit 303 that feed electricity corresponding to the port having the lowest priority of feed need is less than required electricity corresponding to the port having the highest priority of feed need (No at S305), the feed switching information storage unit 305 deletes the priority information for the port having the lowest priority of feed need from the port-by-port priority information 121 because electric energy of the candidate feed source is insufficient (S306). The process of determining feed relation is continued by the terminal number determining unit 301 until the number of ports held by the port-by-port priority information 121 is less than two.

Figure 7:
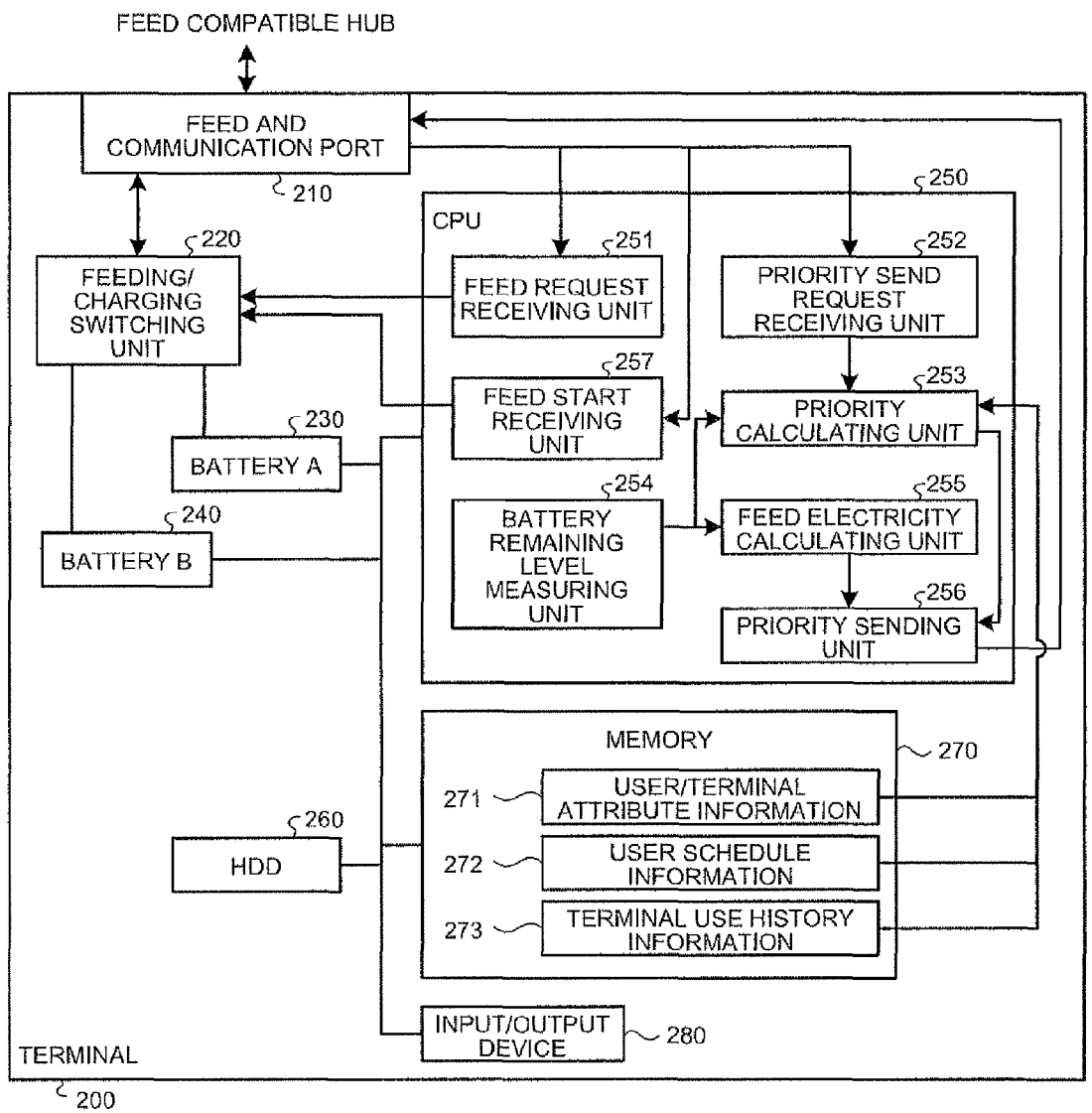
FIG. 7 is a functional block diagram of a configuration of a terminal according to the first embodiment.

Next, FIG. 7 is a functional block diagram of a configuration of a terminal according to the first embodiment. As depicted in FIG. 7, the terminal 200 has a feed and communication port 210, a feeding/charging switching unit 220, a battery A 230, a battery B 240, a CPU 250, a HDD 260, a memory 270, and an input/output device 280.

The feed and communication port 210 is a port through which the feed compatible hub 100 is able to conduct feeding and communication.

The feeding/charging switching unit 220 acquires a feed request from a feed request receiving unit 251 and switches the mode from a charging mode for charging a battery to the feeding mode for feeding electricity of battery. The feeding/charting switching unit 220 acquires a feed start notification from a feed start receiving unit 257, and switches the mode from the feeding mode for feeding electricity of battery to the charging mode for charging a battery. For example, the feeding/charging switching unit 220 has a switch which is switched between the charging mode and the feeding mode, and the switch is changed over when a feed requesting unit a feed start notification is acquired.

The battery A 230 and the battery B 240 are power sources incorporated in the terminal 200, and the terminal 200 feeds other terminal by using either one of the batteries. As a result, a user of the terminal 200 is able to make other operation using the battery A 230 even when the terminal 200 feeds other terminal by using the battery B 240, for example.

The CPU 250 is a central processing unit that reads processors or programs from the memory 270 and executes the processes, and has, as such processors, the feed request receiving unit 251, a priority send request receiving unit 252, a priority calculating unit 253, a battery remaining level measuring unit 254, a feed electricity calculating unit 255, and a priority sending unit 256.

The feed request receiving unit 251 acquires a feed request sent by the feed compatible hub 100, from the feed and communication port 210 and outputs to the feeding/charging switching unit 220.

The priority send request receiving unit 252 acquires a send request of priority of feed need sent by the feed compatible hub 100 from the feed and communication port 210, and outputs to the priority calculating unit 253.

Upon acquisition of a send request of priority of feed need from the priority send request receiving unit 252, the priority calculating unit 253 calculates priority of feed need of the battery B 240, from user/terminal attribute information 271, user schedule information 272 and terminal use history information 273 held by the memory 270, and a battery remaining level of the battery B 240 output by the battery remaining level measuring unit 254. More specifically, the priority calculating unit 253 calculates priority of feed need of the battery B 240 according to the following formula. User attribute value, terminal attribute value, battery consumption degree, average battery consumption degree, and schedule factor degree will be explained later.

Priority of feed need=user attribute value*terminal attribute value*battery consumption degree*average battery consumption degree+ schedule factor degree The priority calculating unit 253 calculates consumed amount of battery to the present from the battery remaining level of the battery B 240 output from the battery remaining level measuring unit 254, and calculates a battery consumption degree which is a numerical value converted from the calculated consumed amount of battery, based on the level of the fully-charged battery as 10.

Here, for convenience of explanation of user attribute value, terminal attribute value, average battery consumption degree, and the schedule factor degree, the memory 270 will be explained. The memory 270 stores execution results and the like including execution midcourse results of processes executed by the CPU 250, and stores the user/terminal attribute information 271, the user schedule information 272 and the terminal use history information 273. The user/terminal attribute information 271, the user schedule information 272 and the terminal use history information 273 are loaded from the HDD 260, for example, when the terminal 200 is started up.

The user/terminal attribute information 271 holds a user attribute indicating a working style of the user of the terminal 200 and a terminal attribute. The user attribute holds, for example, whether the user works outside for sales or works inside. The terminal attribute holds, for example, whether the terminal 200 is portable or nonportable.

The user schedule information 272 holds a schedule of the user of the terminal 200. The user schedule information 272 holds, for example, a scheduled day of business trip or a scheduled day of meeting of the user of the terminal 200.

The terminal use history information 273 holds history of consumption of battery in a day consumed by the user of the terminal 200.

Returning to the priority calculating unit 253, the priority calculating unit 253 refers to the user attribute of the user of the terminal 200 and the terminal attribute of the terminal 200 from the user/terminal attribute information 271 held in the memory 270. At this time, the priority calculating unit 253 sets the user attribute value which is numerical user attribute, for example, at "1" when the user attribute is working outside for sales, while setting the user attribute value, for example, at "0.5" when the user attribute is working inside. Also, the priority calculating unit 253 sets the terminal attribute value which is numerical terminal attribute, for example, at "1" when the terminal attribute is portable, while setting the terminal attribute value, for example, at "0.2" when the terminal attribute is nonportable. As a result, the terminal 200 that is used by a user working outside for sales, and is portable has high need of charging because charging of battery is difficult when the user is out, so that the priority of feed need can be made higher than that of the terminal 200 used by a user working inside.

The priority calculating unit 253 refers to a schedule of the user of the terminal 200 in the day when the send request of priority of feed need is acquired, from the user schedule information 272 held in the memory 270. At this time, the priority calculating unit 253 sets the schedule factor value which is numerical schedule, for example, at "10" when a business trip is scheduled in the day when the send request of priority of feed need is acquired, while setting the schedule factor value, for example, at "5" when a meeting is scheduled. As a result, the need of charging is high because the terminal 200 of the user having a schedule of business trip or a schedule of meeting cannot charge the battery of the terminal 200 during traveling time in the business trip or during the meeting, so that the priority of feed need can be made higher than that of the terminal used by a user having no scheduled business trip or meeting.

The priority calculating unit 253 calculates an average consumed amount of battery used in a day by referring to history of consumed amounts of battery used in a day by the user of the terminal 200 from the terminal use history information 273 held in the memory 270, and calculates an average battery consumption degree. More specifically, the priority calculating unit 253 calculates an average battery consumption degree, obtained by converting the average consumed amount of battery used in a day into a value based on the fully charged battery as 1. As a result, since in the terminal 200 where consumed amount of battery in a day is large, the battery runs out earlier than the terminal 200 where consumed amount is small, the need of charging is high, and the priority of feed need can be made higher than that of the terminal 200 where consumed amount of battery is small.

The battery remaining level measuring unit 254 measures a battery remaining level of the battery B 240, and outputs to the priority calculating unit 253 and the feed electricity calculating unit 255.

The feed electricity calculating unit 255 calculates feedable electric energy from the battery remaining level output from the battery remaining level measuring unit 254 and the current operation state. Then the feed electricity calculating unit 255 outputs the calculated feedable electric energy to the priority sending unit 256.

The priority sending unit 256 outputs the priority of feed need calculated by the priority calculating unit 253, the feedable electric energy output by the feed electricity calculating unit 255, and electric energy required in charging the terminal 200 to the feed and communication port 210 for sending them to the feed compatible hub 100.

The feed start receiving unit 257 acquires the feed start notification sent by the feed compatible hub 100 from the feed and communication port 210, and outputs to the feeding/charging switching unit 220.

The HDD (hard disk drive) 260 is a disc device that stores processes or programs executed by the CPU 250, the user/terminal attribute information 271, the user schedule information 272 and the terminal use history information 273.

The input/output device 280 is a device for connecting an input device such as mouse or keyboard and a display device.

Figure 8:
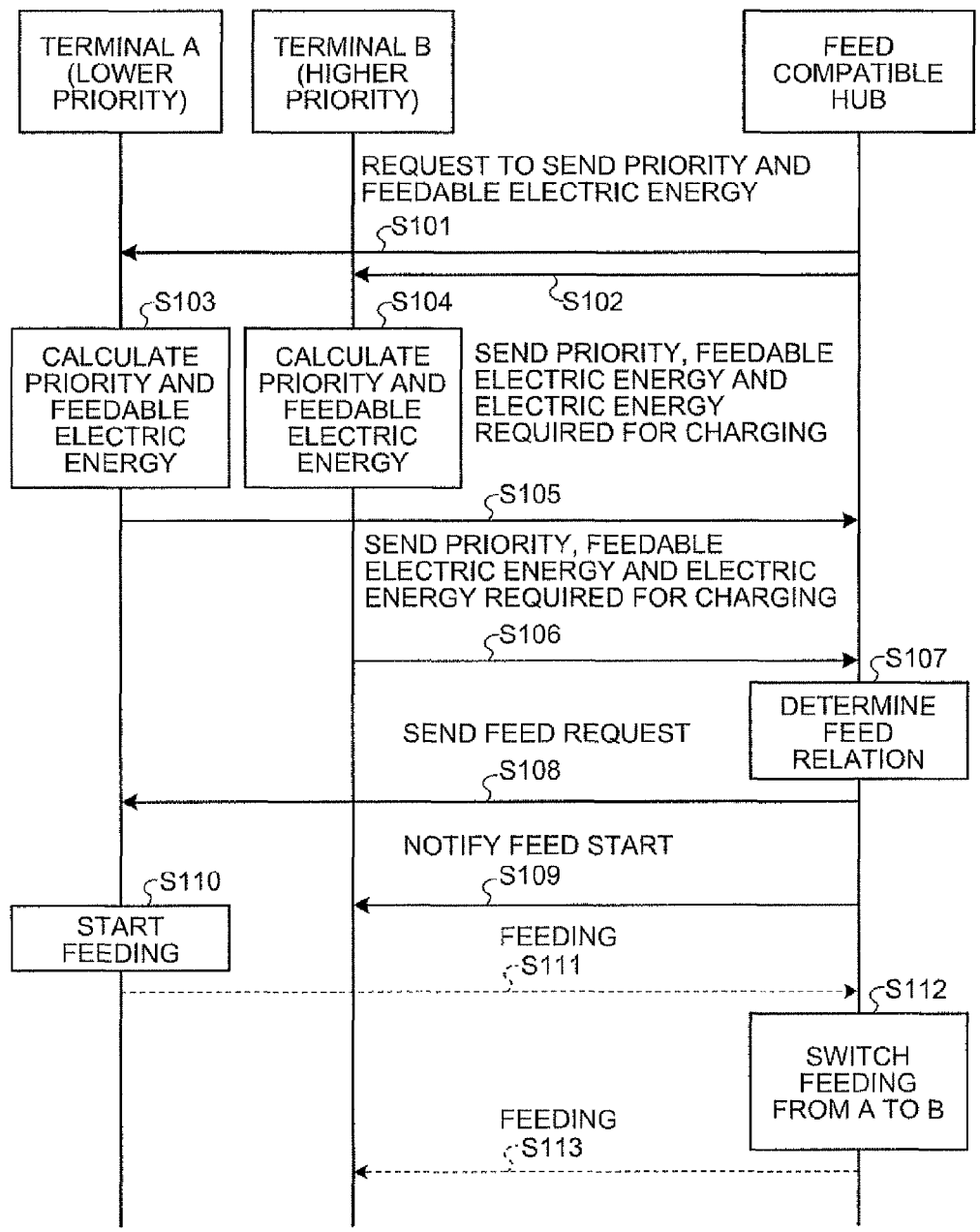
FIG. 8 is a sequence chart of an outline of process of the feeding system according to the first embodiment.

Next, an outline of process of a feeding system according to the first embodiment will be explained with reference to FIGS. 8 and 9. FIG. 8 is a sequence chart of an outline of process of the feeding system according to the first embodiment. In the feeding system, a terminal A having lower priority of feed need and a terminal B having hither priority of feed need are connected to a feed compatible hub.

First, the priority send requesting unit 111 of the feed compatible hub 100 requests the terminal A and the terminal B to send priority of feed need and feedable electric energy (S101, S102).

Upon reception of the request from the feed compatible hub 100 by the priority send request receiving unit 252, the terminal A calculates priority of feed need and feedable electric energy by the priority calculating unit 253 (S103). On the other hand, the terminal B receives the request from the feed compatible hub 100 by the priority send request receiving unit 252, and calculates priority of feed need and feedable electric energy by the priority calculating unit 253 (S104).

Then the terminal A sends the calculated priority of feed need and feedable electric energy by the priority sending unit 256. At this time, the terminal A sends electric energy required for charging (S105). On the other hand, the terminal B sends the calculated priority of feed need and feedable electric energy by the priority sending unit 256. At this time, the terminal B sends electric energy required for charging (S106).

The feed compatible hub receives priority of feed need, feedable electric energy and electric energy required for charging, from each of the terminal A and the terminal B, by the priority receiving unit 112, and determines feed relation by the feed relation determining unit 114 (S107). At this time, the feed relation determining unit 114 determines the terminal A as a feed source, and the terminal B as a feed destination based on the priority of feed need, feedable electric energy and electric energy required for charging received from each of the terminal A and the terminal B.

Then the feed compatible hub sends a feed request to the terminal A which is a feed source by the feed requesting unit 115 (S108). Also the feed compatible hub notifies the terminal B which is a feed destination of start of feeding by the feed start notifying unit 116 (s109).

Then terminal A switches the mode from the charging mode to the feeding mode by the feeding/charging switching unit 220 (S110), to feed electricity to the feed compatible hub from the battery B 240 (S111). The feed compatible hub establishes connection from the terminal A to the terminal B by the electricity switching unit 150 (S112), and feeds the electricity supplied from the terminal A to the terminal B (S113). As a result, the battery of the terminal B is charged.

Figure 9:
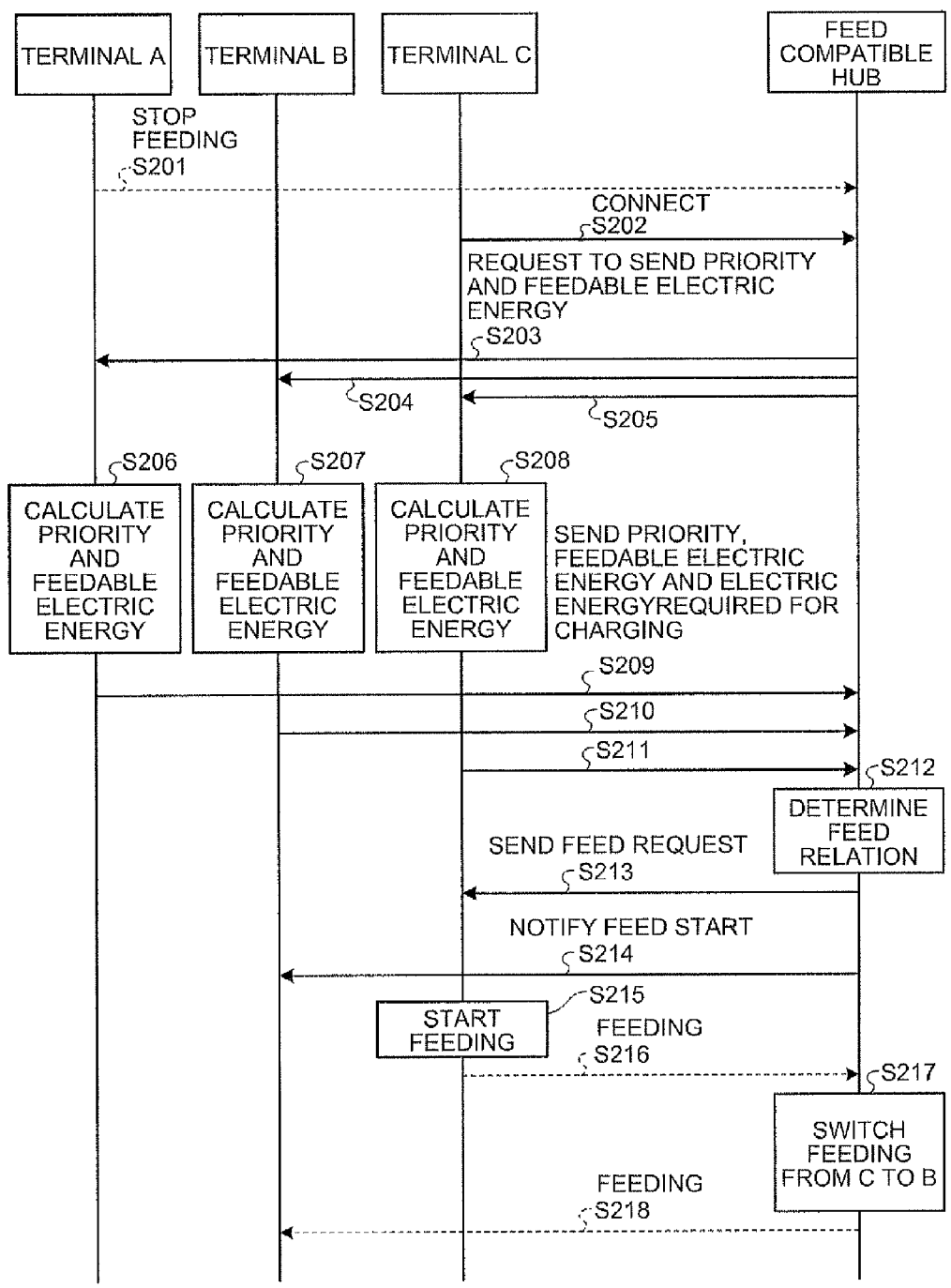
FIG. 9 is a sequence chart of an outline of process of the feeding system according to the first embodiment.

Next, FIG. 9 is a sequence chart of an outline of process of the feeding system when the terminal A ends feeding due to lowering of battery, and a terminal C is newly connected to the feed compatible hub.

First, when the terminal A having conducted feeding ends feeding by lowering of battery, the feed compatible hub detects the end of feeding of terminal A by the electricity switching unit 150 (S201).

Next, when the terminal C is newly connected to the feed compatible hub, the feed compatible hub detects connection of the terminal C by the network switching unit 130 (S202).

Then the priority send requesting unit 111 of the feed compatible hub 100 requests the terminal A, terminal B and terminal C to send priority of feed need and feedable electric energy (S203 to S205).

Then the terminal A receives the request from the feed compatible hub 100 by the priority send request receiving unit 252, and calculates priority of feed need and feedable electric energy by the priority calculating unit 253 (S206). On the other hand, the terminal B and the terminal C also conduct a similar process as the terminal A, and calculate priority of feed need and feedable electric energy (S207, S208).

Then the terminal A sends the calculated priority of feed need and feedable electric energy by the priority sending unit 256. At this time, the terminal A sends electric energy required for charging (S209). On the other hand, the terminal B and terminal C also conduct a similar process as the terminal A (S210, S211).

Then the feed compatible hub receives the priority of feed need, feedable electric energy and electric energy required for charging, from each of the terminal A, terminal B and terminal C by the priority receiving unit 112, and determines feed relation by the feed relation determining unit 114 (S212). At this time, the feed relation determining unit 114 determines the terminal C as a feed source and the terminal B as a feed destination, based on the priority of feed need, feedable electric energy, and electric energy required for charging, received from each of the terminal A, terminal B and terminal C.

Then the feed compatible hub sends a feed request to the terminal C which is a feed source by the feed requesting unit 115 (S213). Also the feed compatible hub notifies the terminal B which is a feed destination of start of feeding by the feed start notifying unit 116 (S214).

Then the terminal C switches the mode from the charging mode to the feeding mode by the feeding/charging switching unit 220 (S215), to feed electricity to the feed compatible hub from the battery B240 (S216). The feed compatible hub establishes connection from the terminal C to the terminal B by the electricity switching unit 150 (S217), and feeds the electricity supplied from the terminal C to the terminal B (S218).

As described above, according to the first embodiment, the feed compatible hub 100 acquires priority of feed need indicating the degree of need of feeding, for each of the plural terminals 200-1 to 200-4; selects two of the terminals 200-1 to 200-4 having different acquired priorities of feed need; determines the one of the selected terminals 200-1 to 200-4 having lower priority of feed need as a feed source, and the other of the terminals 200-1 to 200-4 having higher priority of feed need as a feed destination; connects the determined feed source and the feed destination, and requests the determined feed source to feed electricity.

In this way, since the feed compatible hub 100 enables interchange of electricity between terminals 200-1 to 200-4 by determining the one of the terminals 200-1 to 200-4 having lower priority of feed need as a feed source and the other of the terminals 200-1 to 200-4 having higher priority of feed need as a feed destination from the priorities of feed need of plural terminals 200-1 to 200-4, it is no longer required to use AC power source of high electricity rate in daytime for charging the terminals 200-1 to 200-4, and hence it is possible to save the electricity rate and to equalize the load of electricity demand.

Figure 10:
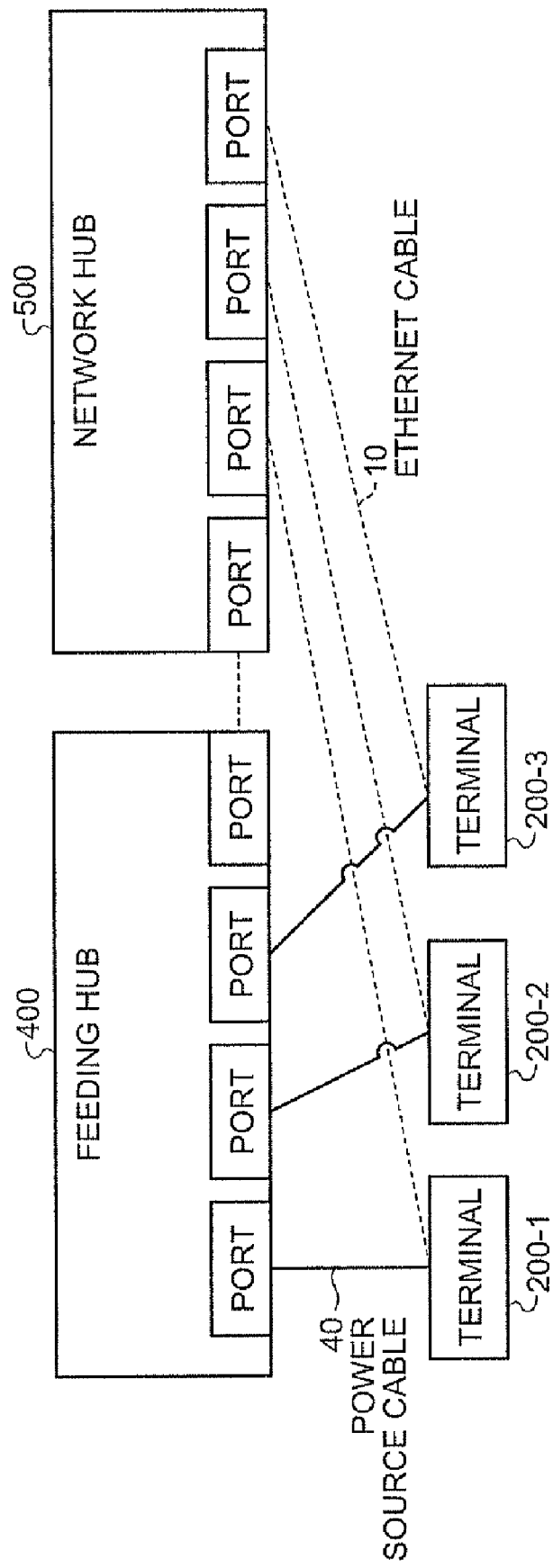
FIG. 10 is a view depicting one example of an overall configuration of a feeding system according to a second embodiment.

Next, an overall configuration of a feeding system according to a second embodiment will be explained with reference to FIG. 10. FIG. 10 is a view depicting one example of an overall configuration of a feeding system according to the second embodiment. As depicted in FIG. 10, the feeding system according to the second embodiment has a feeding hub 400 in place of the feed compatible hub 100 of the feeding system according to the first embodiment (FIG. 1), and the feeding hub 400 is connected with the terminals 200-1 to 200-3 by a power source cable 40, and with a network hub 500 by the Ethernet cable 10. The network hub 500 connects between the feeding hub 400 and the terminals 200-1 to 200-3 by the Ethernet cable 10. Since functions of the Ethernet cable 10 and the terminals 200-1 to 200-3 are similar to those of the first embodiment, the explanation thereof will be omitted.

The feeding hub 400 is a hub specialized for electricity feeding, and relays feeding between the connected plural terminals 200-1 to 200-3. That is, the feeding hub 400 acquires priority indicating the degree of need of feeding for each of the connected terminals 200-1 to 200-3, and intermediates electricity feeding from a terminal of lower priority to a terminal of higher priority among the terminals of different priorities. Here, the priority indicating the degree of need of electricity feeding of terminal is similar to the priority in the first embodiment, and is "priority of feed need". Also in the present embodiment, the feeding hub 400 feeds electricity to the terminals 200-1 to 200-3 from the AC power source in nighttime during which the predetermined electricity rate is low, and essentially does not conduct electricity feeding from AC power source in daytime during which the electricity rate is high.

The network hub 500 is a relay device that exchanges data between the feeding hub 400 and the terminals 200-1 to 200-3. That is, the network hub 500 intermediates communication between the feeding hub 400 and the terminals 200-1 to 200-3.

The power source cable 40 is a cable for supplying electricity between the feeding hub 400 and the terminals 200-1 to 200-3.

Figure 11:
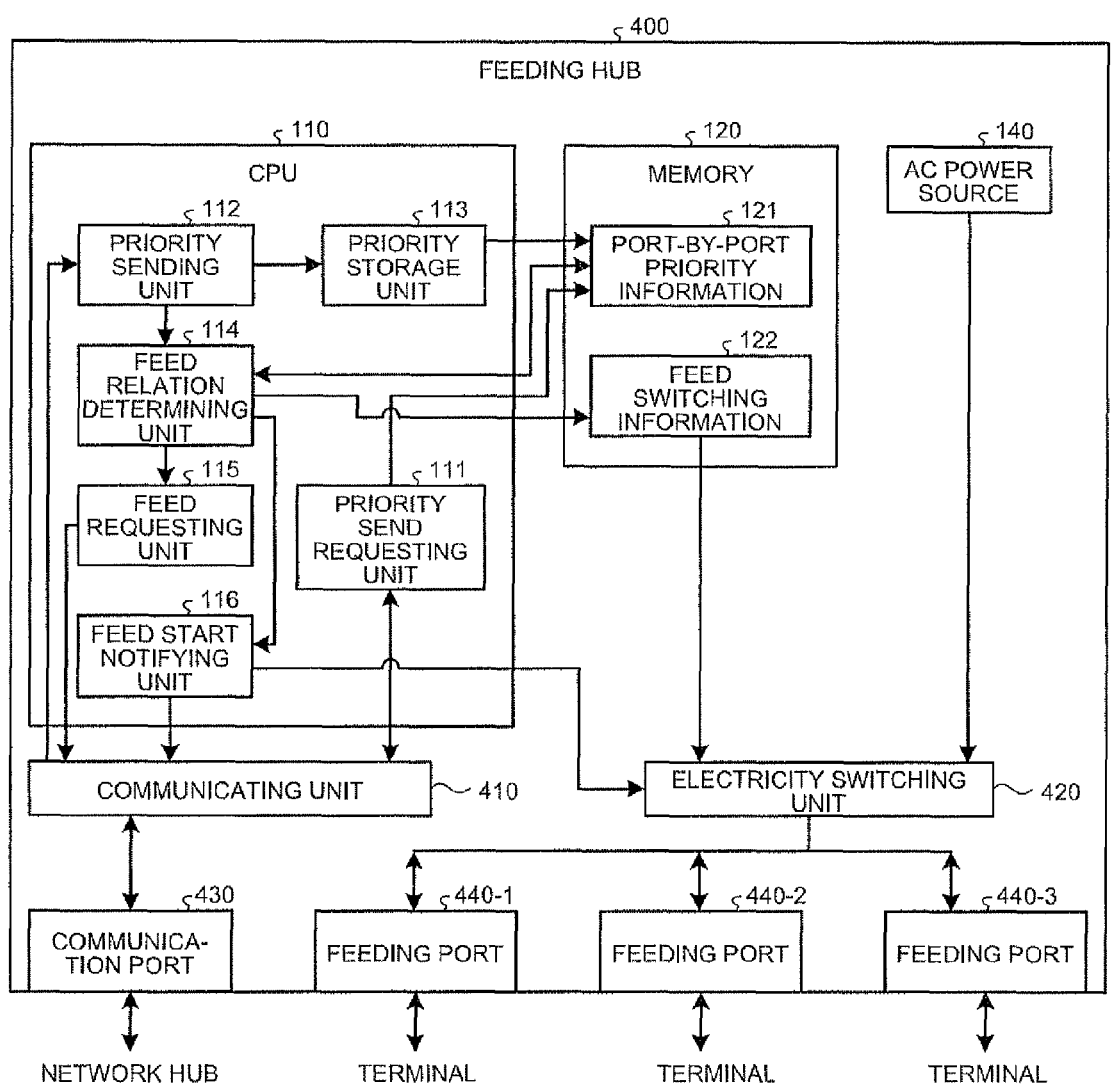
FIG. 11 is a functional block diagram of a configuration of a feeding hub according to the second embodiment.

Next, FIG. 11 is a functional block diagram of a configuration of a feeding hub according to the second embodiment. As depicted in FIG. 11, in the feeding hub 400 according to the second embodiment, the network switching unit 130, the electricity switching unit 150 and the feed and communication ports 160-1 to 160-4 of the feed compatible hub of the first embodiment (FIG. 2) are changed to a communicating unit 410, an electricity switching unit 420, a communication port 430 and feeding ports 440-1 to 440-3. Functions other than the communicating unit 410, the electricity switching unit 420, the communication port 430 and the feeding ports 440-1 to 440-3 in FIG. 11 are similar to those in FIG. 2, and explanation thereof will be simplified.

When it is notified that a terminal is newly connected to the network hub 500 from the communicating unit 410, the priority send requesting unit 111 stores terminal information of the connected terminal contained in the notification, as the port-by-port priority information 121, in the memory 120. The priority send requesting unit 111 outputs a send request to the communicating unit 410 in order to request to send priority of feed need to the terminals 200-1 to 200-3 connected to the feeding ports 440-1 to 440-3.

The feed requesting unit 115 outputs a feed request to the communicating unit 410 in order to request the terminal of feed source determined by the feed relation determining unit 114 to conduct electricity feeding.

After the feed requesting unit 115 outputs a feed request, the feed start notifying unit 116 instructs the electricity switching unit 420 to start feeding. At this time, the feed start notifying unit 116 outputs a feed start notification to the communicating unit 410 in order to notify the terminal of feed destination determined by the feed relation determining unit 114 of start of feeding.

The communicating unit 410 communicates with the terminals 200-1 to 200-3 via the network hub 500 connected with the communication port 430. The communicating unit 410 acquires information sent from the terminals 200-1 to 200-3 from the communication port 430 and outputs to the priority receiving unit 112. Further, the communicating unit 410 sends a priority send request, a feed request, and a feed start notification output from the priority send requesting unit 111, the feed requesting unit 115 and the feed start notifying unit 116 to the terminals 200-1 to 200-3 via the network hub 500.

The electricity switching unit 420 intermediates electricity feeding between the terminals 200-1 to 200-3 connected to the feeding ports 440-1 to 400-3. More specifically, upon acquisition of a feed start instruction from the feed start notifying unit 116, the electricity switching unit 420 establishes connection so that electricity is supplied from the feed source to the feed destination by referring to the feeding port to which the feed source is connected, and the feeding port to which the feed destination is connected from the feed switching information 122.

The communication port 430 allows the feeding hub 400 to communicate with the network hub 500.

The feeding ports 440-1 to 440-3 are ports through which the feeding hub 400 are allowed to conduct electricity feeding.

Figure 12:
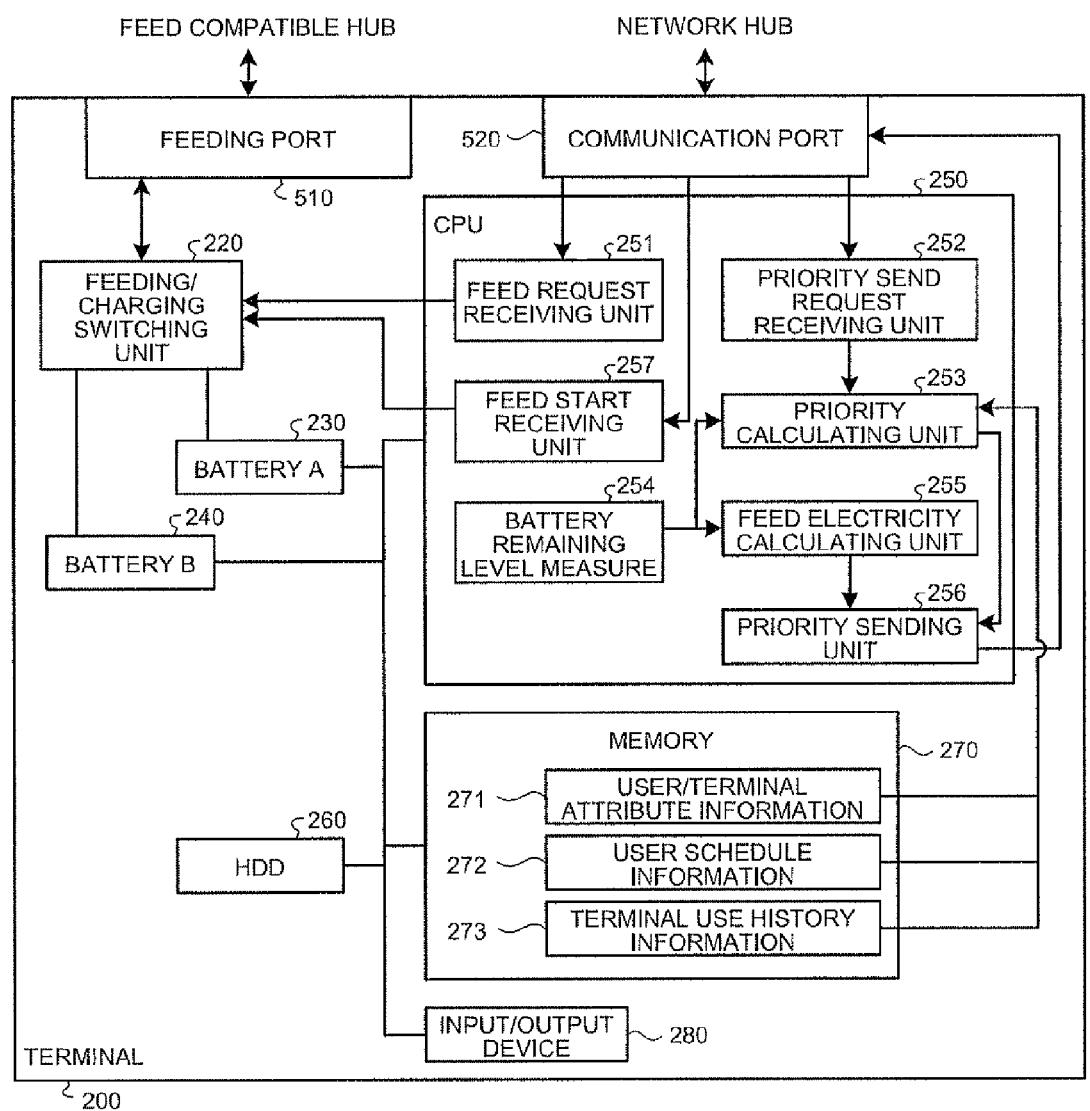
FIG. 12 is a functional block diagram of a configuration of a terminal according to the second embodiment.

Next, FIG. 12 is a functional block diagram of a configuration of the terminal according to the second embodiment. As depicted in FIG. 12, in the terminal 200 according to the second embodiment, the feed and communication port 210 of the terminal according to the first embodiment (FIG. 7) is changed to a feeding port 510 and a communication port 520. Other functions than the feeding port 510 and the communication port 520 in FIG. 12 are similar to those in FIG. 7, and hence explanation thereof will be simplified.

The feeding port 510 is a port capable of supplying electricity to the feeding hub 400 and receiving electricity from the feeding hub 400.

The feeding/charging switching unit 220 acquires a feed request from the feed request receiving unit 251 and switches the mode from the charging mode for charging the battery, to the feeding mode for supplying electricity of the battery. The feeding/charging switching unit 220 acquires a feed start notification from the feed start receiving unit 257, and switches the mode from the feeding mode for supplying electricity of the battery to the charging mode for charging the battery.

The feed request receiving unit 251 acquires the feed request sent by the network hub 500 from the communication port 520, and outputs to the feeding/charging switching unit 220.

The priority send request receiving unit 252 acquires a send request of priority of feed need sent by the network hub 500 from the communication port 520, and outputs to the priority calculating unit 253.

The priority sending unit 256 outputs priority of feed need calculated by the priority calculating unit 253, feedable electric energy output by the electric feed electricity calculating unit 255, and required electric energy for charging the terminals 200, to the communication port 520 for sending to the feeding hub 400.

The feed start receiving unit 257 acquires the feed start notification sent by the network hub 500 from the communication port 520, and outputs to the feeding/charging switching unit 220.

Figure 13:
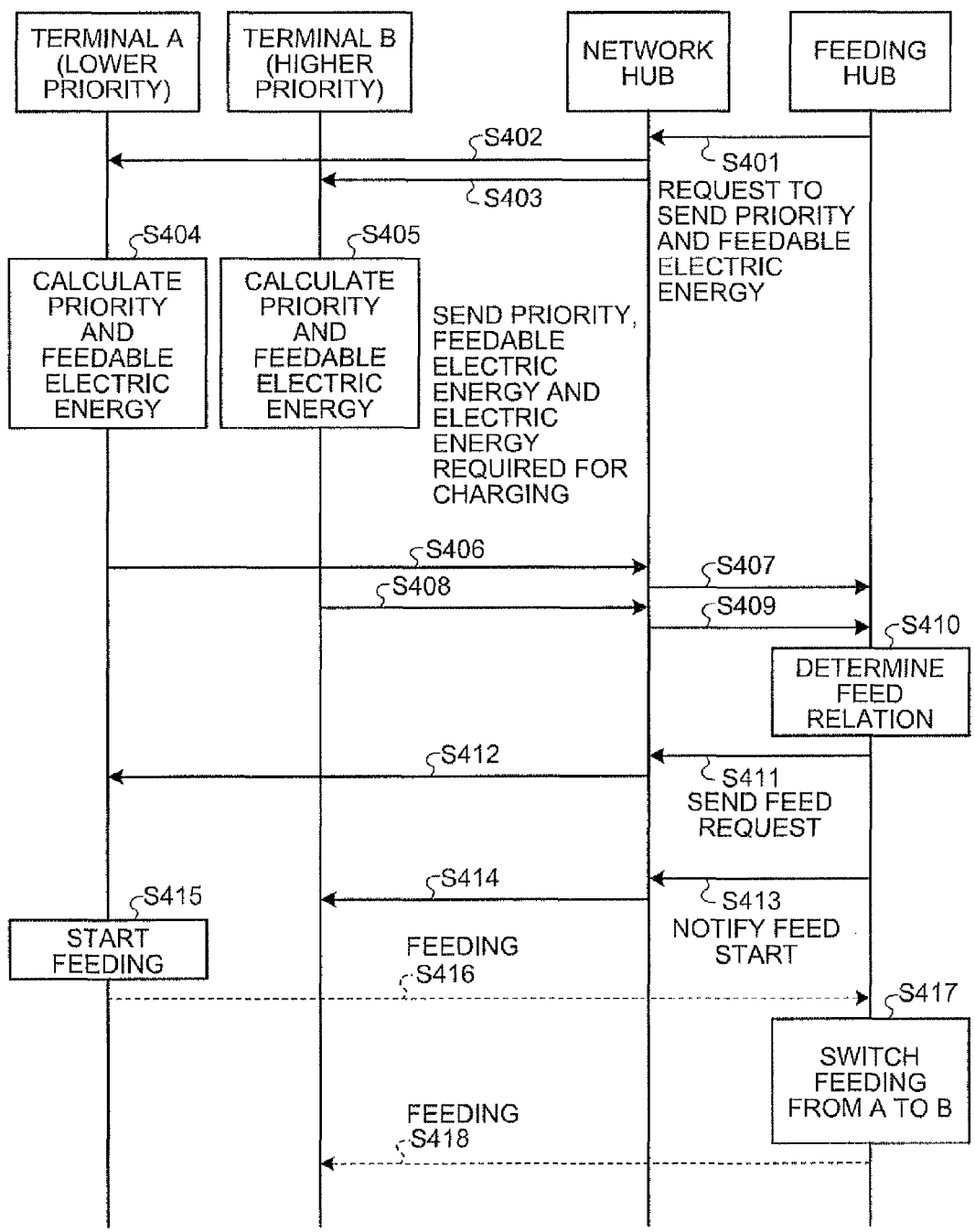
FIG. 13 is a sequence chart of an outline of process of a feeding system according to the second embodiment.

Next, an outline of process of the feeding system according to the second embodiment will be explained with reference to FIG. 13 and FIG. 14. FIG. 13 is a sequence chart of an outline of process by the feeding system according to the second embodiment. In the feeding system, the terminal A having lower priority of feed need and the terminal B having higher priority of feed need are connected with the feeding hub and the network hub.

First, the priority send requesting unit 111 of the feeding hub 400 requests the network hub 500 to send priority of feed need and feedable electric energy to the terminal A and the terminal B (S401). In response to the request from the feeding hub 400, the network hub 500 requests the terminal A and the terminal B to send priority of feed need and feedable electric energy (S402, S403).

Upon reception of the request from the network hub 500 by the priority send request receiving unit 252, the terminal A calculates priority of feed need and feedable electric energy by the priority calculating unit 253 (S404). On the other hand, the terminal B calculates priority of feed need and feedable electric energy by the priority calculating unit 253 (S405) upon reception of the request from the network hub 500 by the priority send request receiving unit 252.

Then the priority sending unit 256 of the terminal A requests the network hub 500 to send the calculated priority of feed need and feedable electric energy to the feeding hub 400. At this time, the terminal A also sends electric energy required for charging (S406). Upon reception of the request from the terminal A, the network hub 500 sends priority of feed need, feedable electric energy and electric energy required for charging to the feeding hub 400 (S407).

On the other hand, the priority sending unit 256 of the terminal B requests the network hub 500 to send the calculated priority of feed need and feedable electric energy to the feeding hub 400. At this time, the terminal B also sends electric energy required for charging (S408). Upon reception of the request from the terminal B, the network hub 500 sends priority of feed need, feedable electric energy and electric energy required for charging to the feeding hub 400 (S409).

Then the feeding hub 400 receives priority of feed need, feedable electric energy and electric energy required for charging from each of the terminal A and terminal B by the priority receiving unit 112, and determines feed relation by the feed relation determining unit 114 (S410). At this time, the feed relation determining unit 114 determines the terminal A as a feed source and the terminal B as a feed destination based on the priority of feed need, feedable electric energy and electric energy required for charging received from each of the terminal A and the terminal B.

Then the feed requesting unit 115 of the feeding hub 400 requests the network hub 500 to send a feed request to the terminal A which is a feed source (S411). Upon reception of the request from the feeding hub 400, the network hub 500 sends a feed request to the terminal A (S412).

On the other hand, the feed start notifying unit 116 of the feeding hub 400 requests the network hub 500 to send a feed start notification to the terminal B which is a feed destination (S413). The network hub 500 sends a feed start notification to the terminal B upon reception of the request from the feeding hub 400 (S414).

Then the terminal A switches the mode from the charging mode to the feeding mode by the feeding/charging switching unit 220 (S415), and feeds electricity to the feeding hub 400 from the battery B240 (S416). The feeding hub 400 establishes connection from the terminal A to the terminal B by the electricity switching unit 420 (S417) and feeds electricity supplied from the terminal A to the terminal B (S418). As a result, the battery of the terminal B is charged.

Figure 14:
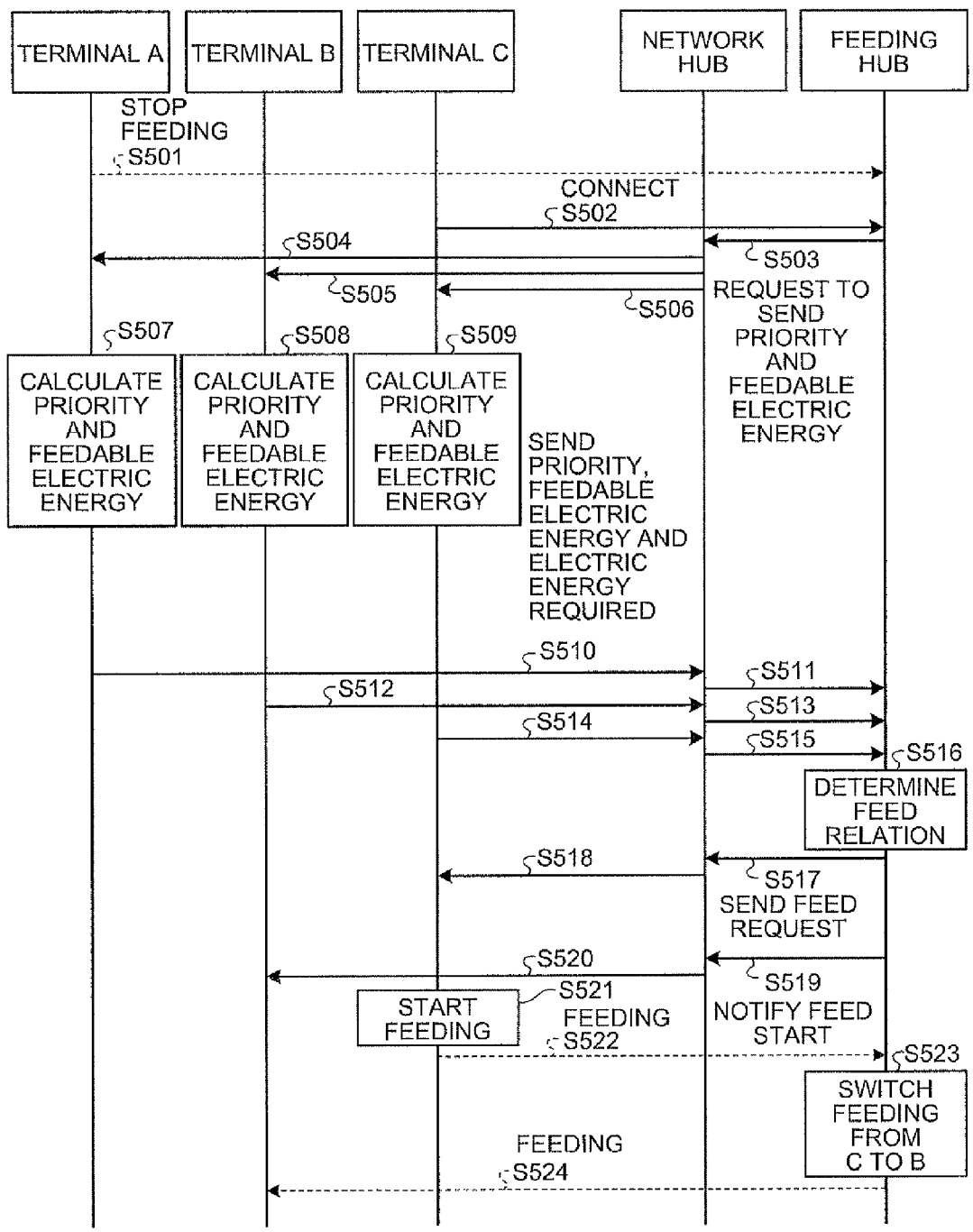
FIG. 14 is a sequence chart of an outline of process of the feeding system according to the second embodiment.

Next, FIG. 14 is a sequence chart of an outline of process of feeding system when the terminal A ends feeding due to lowering of the battery and a terminal C is newly connected to the feeding hub.

First, as the terminal A stops feeding due to lowering of the battery, the feeding hub 400 detects stop of feeding of the terminal A by the electricity switching unit 420 (S501).

Next, as the terminal C is newly connected to the feeding hub 400, the feeding hub 400 detects the connection by the communicating unit 410 (S502).

Then the priority send requesting unit 111 of the feeding hub 400 requests the network hub 500 to make the terminal A, the terminal B and the terminal C to send priority of feed need and feedable electric energy (S503). Upon reception of the request form the feeding hub 400, the network hub 500 requests the terminal A, the terminal B and the terminal C to send priority of feed need and feedable electric energy (S504, S505, S506).

Upon reception of the request from the network hub 500 by the priority send request receiving unit 252, the terminal A calculates priority of feed need and feedable electric energy by the priority calculating unit 253 (S507). On the other hand, the terminal B and the terminal C execute a similar process as the terminal A, and individually calculate priority of feed need and feedable electric energy (S508, S509).

Then the priority sending unit 256 of the terminal A requests the network hub 500 to send the calculated priority of feed need and feedable electric energy to the feeding hub 400. At this time, the terminal A also sends the electric energy required for charging (S510). Upon reception of the request from the terminal A, the network hub 500 sends priority of feed need, feedable electric energy and electric energy required for charging to the feeding hub 400 (S511). On the other hand, the terminal B and the terminal C also execute a similar process as the terminal A (S512 to S515).

Then the feeding hub 400 receives priority of feed need, feedable electric energy and electric energy required for charging, from each of the terminal A, the terminal B and the terminal C by the priority receiving unit 112, and determines feed relation by the feed relation determining unit 114 (S516). At this time, the feed relation determining unit 114 determines the terminal C as a feed source and the terminal B as a feed destination based on the priority of feed need, feedable electric energy and electric energy required for charging received from each of the terminal A, the terminal B and the terminal C.

Then the feed requesting unit 115 of the feeding hub 400 requests the network hub 500 to send a feed request to the terminal C which is a feed source (S517). Then upon reception of the request of feeding hub 400, the network hub 500 sends a feed request to the terminal C (S518).

On the other hand, the feed start notifying unit 116 of the feeding hub 400 requests the network hub 500 to send a feed start notification to the terminal B which is a feed destination (S519). In response to the request from the feeding hub 400, the network hub 500 sends a feed start notification to the terminal B (S520).

Then the terminal C switches the mode from the charging mode to the feeding mode by the feeding/charging switching unit 220 (S521), and feeds electricity to the feeding hub 400 from the battery B 240 (S522). The feeding hub 400 establishes connection from the terminal C to the terminal B by the electricity switching unit 420 (S523) and feeds the electricity supplied from the terminal C to the terminal B (S524). As a result, the battery of the terminal B is charged.

As described above, according to the second embodiment, the feeding hub 400 acquires priority of feed need indicating the degree of need of feeding, from each of the plural terminals 200-1 to 200-3 via the communication port 430, selects two of the terminals 200-1 to 200-3 having different acquired priorities of feed need, determines the one of the selected terminals 200-1 to 200-3 having lower priority of feed need as a feed source, and the other of the selected terminals 200-1 to 200-3 having higher priority of feed need as a feed destination, connects the determined feed source and the feed destination, and requests the determined feed source to conduct electricity feeding via the communication port 430.

In this manner, the feeding hub 400 determines the one of the plural terminals 200-1 to 200-3 having lower priority as a feed source and the other of the terminals 200-1 to 200-3 having higher priority as a feed destination. Since interchange of electricity between terminals 200-1 to 200-3 is enabled, it is no longer required to use AC power source of high electricity rate in daytime for charging the terminals 200-1 to 200-3, and it is possible to save the electricity rate and to equalize the load of electricity demand. Further, since the feeding hub 400 communicates with the terminals 200-1 to 200-3 via the communication port 430 which is different from a port for conducting electricity feeding, interchange of electricity between the terminals 200-1 to 200-3 is enabled even in the terminals 200-1 to 200-3 that are incompatible to the PoE. Hence the electricity rate can be saved, and the load of electricity demand can be equalized.

Each process function executed at the feed compatible hub 100 and the feeding hub 400 may be fully or partly implemented by a program that is analyzed and executed by the CPU (central processing unit) or implemented by hardware according to wired logic.

According to the embodiments, since the feed intermediate apparatus enables interchange of electricity between communication devices by determining a communication device having lower priority as a feed source, and determining a communication device having higher priority as a feed destination in priorities of plural communication devices, it is no longer required to use AC power source of high electricity rate in daytime for charging the communication device, so that it is possible to save the electricity rate and to equalize the load of electricity demand.

Accordingly, the feed intermediate apparatus, the feeding system, the feed intermediate method and the feeding method are advantageously able to intermediate electricity feeding between communication devices that are drivable by battery so that the electricity rate is reduced, and the load of electricity demand is equalized.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A feed intermediate apparatus comprising:
a first requesting unit that requests a priority, first electric energy that can be fed by a feed source, and second electric energy that is required to charge a feed destination for each of the plurality of communication devices, the priority being a value that indicates degree of need of electricity feeding and is calculated from battery consumption degree;
an acquiring unit that acquires the priority, the first electric energy, and the second electric energy for each of the plurality of communication devices, the acquiring unit storing acquired priority, first electric energy, and second electric energy in a memory;
a selecting unit that selects a communication device that has the highest priority of feed need as a feed destination and selects a communication device that has the lowest priority of feed need as a feed source;
a determining unit that determines whether feed electricity corresponding to the feed source is equal to or more than required electricity corresponding to the feed source by referring to the memory, the determining unit deleting the priority information for the feed source and the feed destination in the memory when feed electricity corresponding to the feed source is equal to or more than required electricity corresponding to the feed source;
a connecting unit that connects the feed source and the feed destination determined by the determining unit when the determining unit determines that feed electricity corresponding to the feed source is equal to or more than required electricity corresponding to the feed source; and
a second requesting unit that requests the feed source to supply electricity and the feed destination to charge a battery by electricity from the feed source.

2. A communication device comprising:
a first receiving unit that receives a request for a priority, first electric energy that can be fed by a feed source, and second electric energy that is required to charge a feed destination from a feed intermediate apparatus, the priority being a value that indicates degree of need of electricity feeding;
a calculating unit that calculates the priority based on a battery consumption degree, the first electric energy based on a battery remaining level and a current operation state, and the second electric energy based on the battery remaining level, the battery consumption degree being a numerical value converted from calculated consumed amount of the battery based on a level of a fully-charged battery;
a sending unit that sends the priority, the first electric energy, and the second electric energy to the feed intermediate apparatus;
a second receiving unit that receives a request for feeding or charging from the feed intermediate apparatus; and
a controlling unit that controls the battery to supply electric energy to other communication device or to charge the battery by transmitted electric energy from other communication device when the second receiving unit received the request.

3. The communication device according to claim 2, wherein the priority is weighed according to whether the communication device is portable or non-portable.

4. The communication device according to claim 2, wherein the priority is weighed according to an average consumed amount of battery of the communication device.

5. The communication device according to claim 2, wherein the priority is weighed according to a schedule of a user of the communication device.

6. A feeding system including a feed intermediate apparatus and a plurality of chargeable communication devices, the feed intermediate apparatus comprising:
a first requesting unit that requests a priority, first electric energy that can be fed by a feed source, and second electric energy that is required to charge a feed destination for each of the plurality of communication devices, the priority being a value that indicates degree of need of electricity feeding and is calculated from battery consumption degree;
an acquiring unit that acquires the priority, the first electric energy, and the second electric energy for each of the plurality of communication devices, the acquiring unit storing acquired priority, first electric energy, and second electric energy in a memory;
a selecting unit that selects a communication device that has the highest priority of feed need as a feed destination and selects a communication device that has the lowest priority of feed need as a feed source;
a determining unit that determines whether feed electricity corresponding to the feed source is equal to or more than required electricity corresponding to the feed source by referring to the memory, the determining unit deleting the priority information for the feed source and the feed destination in the memory when feed electricity corresponding to the feed source is equal to or more than required electricity corresponding to the feed source;
a connecting unit that connects the feed source and the feed destination determined by the determining unit when the determining unit determines that feed electricity corresponding to the feed source is equal to or more than required electricity corresponding to the feed source; and
a second requesting unit that requests the feed source to supply electricity and the feed destination to charge a battery by electricity from the feed source, wherein
the feed source includes a request receiving unit that receives the request from the second requesting unit, and a feeding unit that feeds electricity to the feed destination upon reception of the from the request receiving unit.

7. The feeding system according to claim 6, wherein the feed source further includes a self feed unit that supplies electricity to the feed source while supplying electricity to the feed destination by the feeding unit.

8. A feed intermediate method comprising:
first requesting a priority, first electric energy that can be fed by a feed source, and second electric energy that is required to charge a feed destination for each of the plurality of communication devices, the priority being a value that indicates degree of need of electricity feeding and is calculated from battery consumption degree;
acquiring the priority, the first electric energy, and the second electric energy for each of the plurality of communication devices, the acquiring storing acquired priority, first electric energy, and second electric energy in a memory;
selecting a communication device that has the highest priority of feed need as a feed destination and selects a communication device that has the lowest priority of feed need as a feed source;
determining whether feed electricity corresponding to the feed source is equal to or more than required electricity corresponding to the feed source by referring to the memory, the determining deleting the priority information for the feed source and the feed destination in the memory when feed electricity corresponding to the feed source is equal to or more than required electricity corresponding to the feed source;
connecting the feed source and the feed destination determined by the determining when the determining determines that feed electricity corresponding to the feed source is equal to or more than required electricity corresponding to the feed source; and
second requesting the feed source to supply electricity and the feed destination to charge a battery by electricity from the feed source.

9. The feed intermediate apparatus according to claim 1, wherein the selecting unit selects the same order of priority of feed need from top as the feed destination and bottom as the feed source from the communication devices.

10. The feeding system according to claim 6, wherein the feed intermediate apparatus runs in predetermined daytime during which the electricity rate is high.

11. The feeding system according to claim 6, wherein the feed intermediate apparatus processes to charge the plurality of communication devices from AC power source in predetermined nighttime during which the electricity rate is low.

12. The communication device according to claim 2, wherein the priority is weighed according to a working style of a user of the communication device.

13. The communication device according to claim 2, wherein the battery includes a first battery and a second battery, the first battery and the second battery being power sources incorporated in the battery, the communication device feeding other communication device by using either one of the first battery and the second battery.

14. A feed system comprising:
a feed intermediate apparatus; and
a plurality of communication devices, wherein the feed intermediate apparatus including:
a first requesting unit that requests a priority, first electric energy that can be fed by a feed source, and second electric energy that is required to charge a feed destination for each of the plurality of communication devices, the priority being a value that indicates degree of need of electricity feeding and is calculated from battery consumption degree;
an acquiring unit that acquires the priority, the first electric energy, and the second electric energy for each of the plurality of communication devices, the acquiring unit storing acquired priority, first electric energy, and second electric energy in a memory;
a selecting unit that selects a communication device that has the highest priority of feed need as a feed destination and selects a communication device that has the lowest priority of feed need as a feed source;
a determining unit that determines whether feed electricity corresponding to the feed source is equal to or more than required electricity corresponding to the feed source by referring to the memory, the determining unit deleting the priority information for the feed source and the feed destination in the memory when feed electricity corresponding to the feed source is equal to or more than required electricity corresponding to the feed source;
a connecting unit that connects the feed source and the feed destination determined by the determining unit when the determining unit determines that feed electricity corresponding to the feed source is equal to or more than required electricity corresponding to the feed source; and a second requesting unit that requests the feed source to supply electricity and the feed destination to charge a battery by electricity from the feed source, and wherein the communication device including:

a first receiving unit that receives a request for a priority, first electric energy that can be fed by a feed source, and second electric energy that is required to charge a feed destination from a feed intermediate apparatus, the priority being a value that indicates degree of need of electricity feeding;

a calculating unit that calculates the priority based on a battery consumption degree, the first electric energy based on a battery remaining level and a current operation state, and the second electric energy based on the battery remaining level, the battery consumption degree being a numerical value converted from calculated consumed amount of the battery based on a level of a fully-charged battery;

a sending unit that sends the priority, the first electric energy and the second electric energy to the feed intermediate apparatus;

a second receiving unit that receives a request for feeding or charging from the feed intermediate apparatus; and a controlling unit that controls the battery to supply electric energy to other communication device or to charge the battery by transmitted electric energy from other communication device when the second receiving unit received the request.

\* \* \* \* \*